Sept. 7, 1937.  H. Z. BIXLER  2,092,046
SPRING SUSPENSION
Filed May 16, 1936

Inventor
HARRY Z. BIXLER
By Francis J. Klempay
Attorney

Patented Sept. 7, 1937

2,092,046

UNITED STATES PATENT OFFICE 2,092,046

SPRING SUSPENSION

Harry Z. Bixler, Youngstown, Ohio

Application May 16, 1936, Serial No. 80,087

7 Claims. (Cl. 267—20)

My invention relates to a spring suspension device for vehicles and more particularly to a spring suspension device utilizing a plurality of helical springs in place of leaf springs customarily employed. Helical springs improve the riding qualities of vehicles by providing more flexible and smoother acting shock absorbing characteristics and by reducing the unsprung weight of the vehicle.

Prior suspension devices, within my knowledge, of the type disclosed herein have not been satisfactory in use and consequently have not been widely adopted. In the devices of the prior art no means has been provided to effectively limit excess lateral displacement of the vehicle body with respect to the wheels while requiring no change in the usual construction of the axles, frames, or other components.

Accordingly it is an object of this invention to provide a helical spring suspension for vehicles having means to effectively limit excessive lateral displacement of the frame and body relatively to the wheels.

Another object of this invention is to provide a multiple helical spring suspension for vehicles having a relatively few number of parts which may be economically made by simple manufacturing processes and which lend ruggedness and durability to the structure.

Still another object of the invention is to provide a simple and durable multiple helical spring suspension device which is readily adaptable to existing motor vehicles without change in any essential part thereof and with a minimum of labor and expense.

A further object of the invention is to provide a construction wherein the individual helical springs may be very readily interchanged or replaced thus providing a unique method of quickly altering the riding and load-bearing qualities of the vehicle to compensate for different conditions of roads and load. Also it will be appreciated that springs lose some of their resiliency after long use and become less effective. This invention by permitting easy changing of the springs provides a means whereby the original riding qualities of the vehicle may be readily restored.

Other objects and advantages of the invention will become apparent from a consideration of the drawing and the following specification. It is to be understood, of course, that changes in the specific form disclosed may be made within the scope of what is claimed without departing from the spirit of the invention.

In the drawing, Figure 1 represents a side elevation of the spring assembly, as applied to the rear axle of a motor vehicle, some parts being shown in section.

Figure 1:
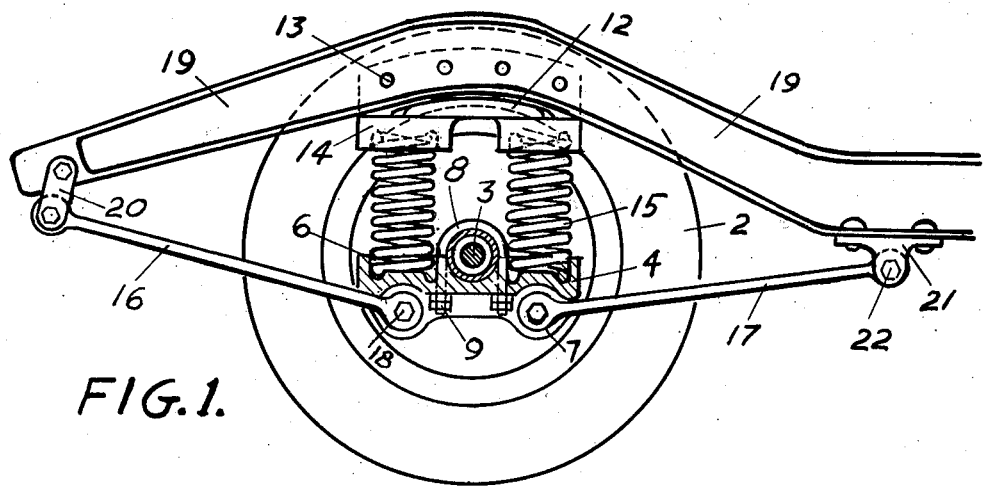

The numeral 1 indicates the rear axle housing on which the wheel 2 is rotatably supported in any known manner, the wheel being driven by shaft 3. The spring carrier 4 is rigidly attached to the lower side of housing 1 by U-bolts 8 and nuts 9. Spring carrier 4 is symmetrical and has a plurality of cup-shaped depressions 6 of substantial depth on its upper side, equally divided in front and back of the housing 1, to receive the lower ends of the helical springs 15. It is obvious that any number of springs may be used and accordingly any number of pockets 6 may be provided. The center portion of the upper face of the spring carrier 4 is provided with a transversely extending groove or seat to fit about the housing 1. The lower face of the carrier 4 is integrally provided with a plurality of pairs of depending lugs 7, of substantial width to give them strength, to receive the enlarged ends of brace members 16 and 17. Laterally aligned openings are made in lugs 7 through which pins 18 pass to pivotally attach members 16 and 17 to the carrier 4. A smooth surface is machined or otherwise placed on the inner surfaces of lugs 7 which are in parallel planes.

In order to place the vehicle body and center of weight as low as possible it has been found necessary to drop the center portion of the frame, leaving an arch in the frame over the rear axle and in some instances over the front axle as is well known in the art. The spring cap member 14 is placed within the arch at the apex thereof, and is securely fastened to the frame member 19 by rivets 13 passing through the frame member 19 and a vertical flange 11 integral with cap member 14. The upper surface of member 14 is provided with a curved seat to accurately engage the contour of the under part of the frame member. This results in a very rugged construction with simple elements and avoids undesirable concentration of loads. Moreover the member 14 materially aids in strengthening the frame thereby allowing lighter gauge materials to be used in its construction. Cap 14 is provided with recesses on its lower face similar to recesses 6 to securely box and hold the springs in position.

Figure 2:
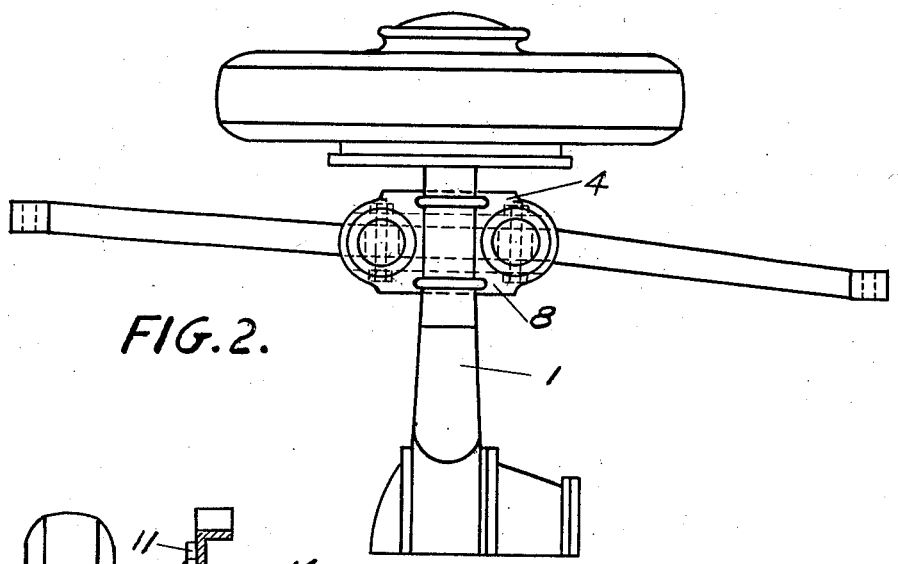
Figure 2 is a plan view, the frame and spring members being removed.
Figure 3:
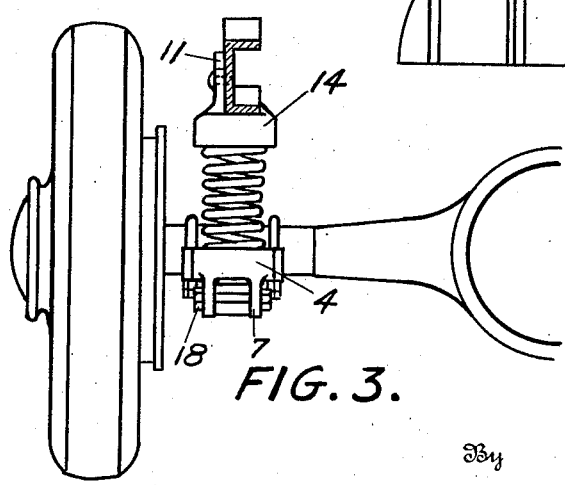
Figure 3 is an end elevation.

As shown in Figure 2, the brace members 16 and 17 extend obliquely to the axis of the axle housing 1 to position their outer ends beneath portions of the curved or obliquely extending side rails of the frame and to lend resistance to side sway of the vehicle frame and body. The inner ends of the braces are pivotally attached to spring carrier 4 as described above. The outer end of brace 16 is pivotally attached to swinging links 20 which in turn are pivotally attached to the frame side rail. The outer end of brace 17 is pivotally attached within bracket 21 by means of pin 22, the bracket 21 being rigidly fastened to the frame side rail in any suitable manner. Hinge pins 18 and 22 and the hinge pins connecting links 20 with the frame and the outer end of brace member 16 are aligned parallel with each other and with the axis of the axle to insure free movement of the brace members 16 and 17 upon flexing of the springs 15.

By the use of obliquely positioned brace members and parallel hinge pins, I am enabled to adapt my improvement to vehicles having frames of various shapes and contours and no limitations of design need be placed thereon. Moreover, the obliquely extending brace members add to the rigidity of the assembly.

The brace members 16 and 17 are of substantial width, as shown, and have enlarged ends, the side edges of which are carefully machined to fit closely within lugs 7, bracket 21 and link 20. These features lend additional resistance to side sway of the vehicle frame and body as will be apparent.

Preferably brace members 16 and 17 are made of resilient steel to prevent their shearing off when the axle and frame assume a non-parallel relationship and to lend additional resiliency to the suspension device.

It can readily be seen that this invention provides a multiple helical spring suspension assembly which overcomes many of the shortcomings of prior devices and which can be made with a minimum of expense. For example, members 4 and 14 can be made by a simple stamping or forging operation. The device is easily assembled, enhances the structural strength of the vehicle, avoids load concentrations and materially reduces the unsprung weight of the vehicle.

Having described the invention, I claim:

1. A spring carrier for a spring suspension device comprising an integral member with a central portion having a transverse groove on its upper surface, longitudinally extending portions having upwardly opening recesses on their upper surfaces, a pair of depending spaced parallel lugs on the lower surface of each of said longitudinally extending portions, transversely aligned openings in said lugs, a transversely extending hinge pin passing through said openings, said hinge pin being positioned beneath said upwardly opening recess.

2. A spring carrier for a spring suspension device comprising a member with a central portion having a transverse groove on its upper surface, longitudinally extending portions having spring seats on their upper surfaces, a pair of spaced parallel flanges on the lower surface of said central portion and longitudinally extending portions, transversely aligned openings in said flanges adjacent their ends, and transversely extending hinge pins passing through said transversely aligned openings.

3. The combination of a vehicle frame member having an arch therein, a spring pressed member engaging the frame member within the arch, the engaging surface of the spring pressed member being curved to conform to the curve of the arch and being in contact with said frame member uniformly throughout the length of the spring pressed member, and an integral vertical flange on said spring pressed member adapted to engage a side portion of the frame member.

4. A vehicle construction comprising a channel-shaped longitudinally extending frame member, a transversely extending axle, said frame member being arched above said axle, a spring carrier secured beneath said axle and provided with an upwardly opening cup-like depression positioned on each side of the axle, a cap member secured to the frame within the arch and having an upper curved surface to fit the lower arched surface of the frame member, said cap member being provided with an integral vertical flange adapted to be rigidly secured to the vertical portion of the channel-shaped frame member, said cap member being provided with a pair of integral downwardly opening cup-like depressions, and a pair of helical springs having their ends seated in the depressions of the spring carrier and the cap member.

5. In a spring suspension device for vehicles, the combination of a frame member having an arch therein, an axle positioned beneath said arch, a spring carrier secured beneath said axle and having an upwardly extending cup-like portion on each side of the axle and a plurality of integral downwardly extending lugs, a cap member secured to the frame within the arch and having a plurality of downwardly extending cup-like portions, helical springs positioned with their ends in the cup-like portions, resilient flat braces having their inner ends pivotally connected within adjacent pairs of said lugs and their outer ends pivotally attached to the frame, the relative size of the parts being such that in the normal operation of the vehicle the braces will be generally horizontal.

6. In a spring suspension device for vehicles, the combination of an arched frame and an axle therebeneath, a spring carrier comprising an integral member having a transverse groove on its upper surface rigidly attached beneath said axle, said carrier having longitudinally extending portions with upwardly opening recesses therein constituting spring seats, a pair of spaced parallel flanges on the lower surface of said spring carrier, transversely aligned openings in said flanges adjacent their ends, a cap member secured to said frame within the arch and provided with a pair of downwardly opening recesses, helical springs positioned with their ends in the recesses of the cap member and spring carrier, a pair of flat resilient braces pivotally attached to said spring carrier by hinge pins passing through said openings, the outer ends of the braces being pivotally attached to the frame.

7. In a spring suspension device for vehicles, the combination of a frame member having an arch therein, an axle positioned beneath said arch, a spring carrier secured beneath said axle and having an upwardly extending spring seat on each side of the axle and a plurality of integral downwardly extending lugs, a cap member secured to the frame within the arch and having a plurality of downwardly extending spring seats, helical springs positioned with their ends in the seats, resilient flat braces having their inner ends pivotally connected within adjacent pairs of said lugs and their outer ends pivotally attached to the frame, said braces extending in a direction oblique to the longitudinal axis of the axle, the arrangement of the parts being such that in the normal operation of the vehicle the braces will be generally horizontal.

HARRY Z. BIXLER.